Oct. 28, 1924.

M. R. KREAMER

VALVE MECHANISM

Filed Oct. 11, 1922    3 Sheets-Sheet 1

1,513,606

INVENTOR
Monroe R. Kreamer
BY
O. M. Clarke
ATTORNEY

Oct. 28, 1924.
M. R. KREAMER
1,513,606
VALVE MECHANISM
Filed Oct. 11, 1922   3 Sheets-Sheet 2
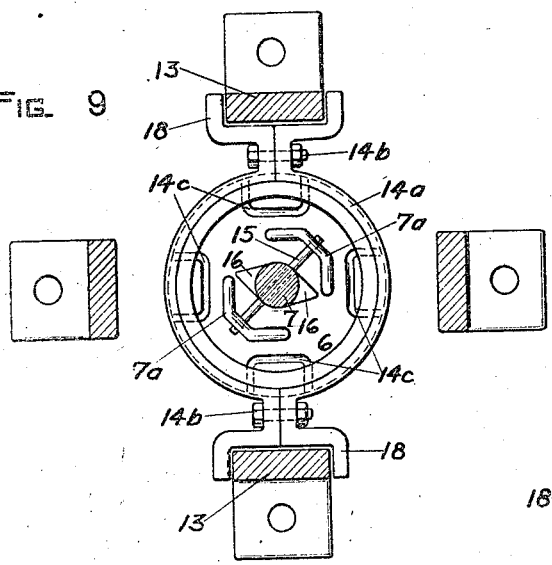
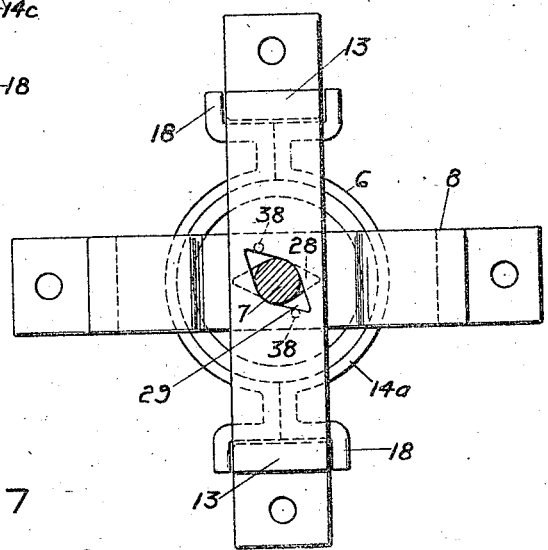
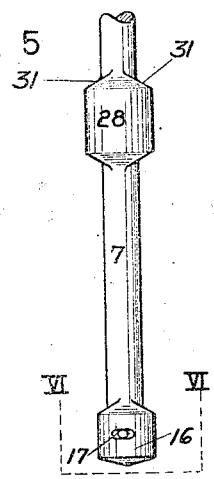
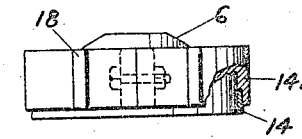
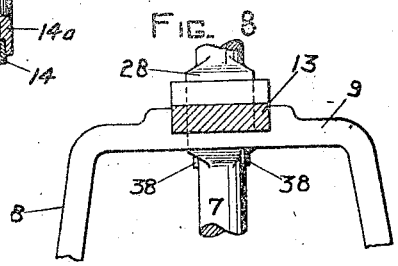
INVENTOR
Monroe R. Kreamer
BY
O. M. Clarke
ATTORNEY Oct. 28, 1924.

M. R. KREAMER

VALVE MECHANISM

Filed Oct. 11, 1922   3 Sheets-Sheet 3

1,513,606

INVENTOR
Monroe R. Kreamer
BY
ATTORNEY

Patented Oct. 28, 1924.

1,513,606

UNITED STATES PATENT OFFICE.

MONROE R. KREAMER, OF AARONSBURG, PENNSYLVANIA.

VALVE MECHANISM.

Application filed October 11, 1922. Serial No. 593,628.

*To all whom it may concern:*

Be it known that I, MONROE R. KREAMER, a citizen of the United States, residing at Aaronsburg, in the county of Center and State of Pennsylvania, have invented certain new and useful Improvements in Valve Mechanism, of which the following is a specification.

My invention consists of an improvement in valve mechanism for liquid containers, and particularly for tank cars or other vessels subject to the usual strains of traffic.

The objects in view are to provide a device of such character which shall be simple in construction, easily operated and locked or unlocked, with a minimum tendency to breakage, overcoming the disturbing effect of motion of the tank car, and having the features of advantage and novelty hereinafter set forth.

In the drawings, showing certain preferred embodiments of the invention:

Fig. 4 is a cross section on the line IV—IV of Fig. 2, on a reduced scale;

Fig. 5 is a detail view in front elevation of the lower portion of the valve actuating spindle;

Fig. 6 is a cross section on the line VI—VI Fig. 5;

Fig. 7 is a sectional detail view of the valve;

Fig. 8 is a similar view in elevation of the cross member and the mounting therein of the valve spindle:

Fig. 9 is a horizontal section on the line IX—IX of Fig. 1;

Figure 1:
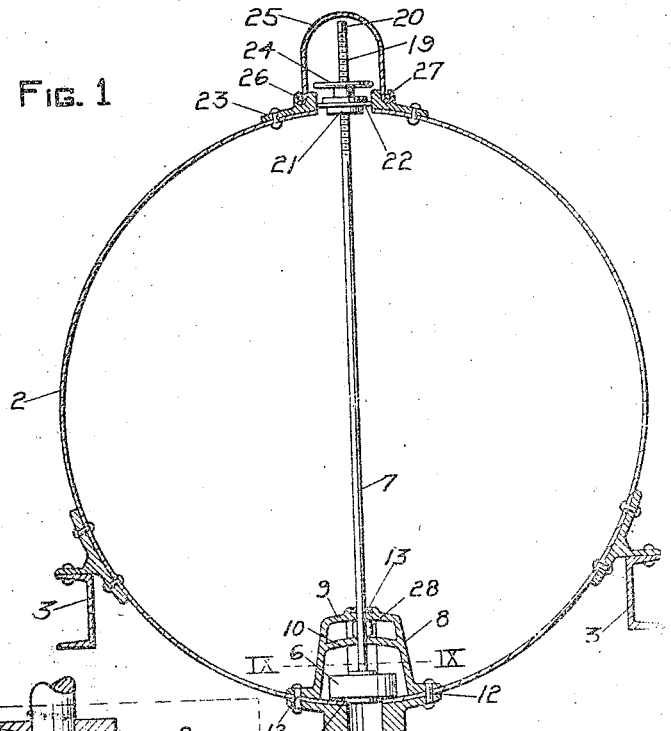
Fig. 1 is a cross section of a tank car showing one form of the mechanism in position.

In the drawings, 2 is the body of a tank car carried by the side sills 3 thereof, in the usual way, and having an outlet conduit 4 surrounding the valve seat 5 of usual construction. A valve 6 seats thereon, and is adapted to be raised or lowered by a spindle 7 extending downwardly from the top of the tank 2 through a supporting pedestal or bracket 8. The bracket 8 has an upper cross member 9 and a lower bridge piece 10 and pedestals 11 secured to the bottom of the tank by rivets or bolts 12. A cross bracing member 13 is framed into the top of bracket 8, as shown, and similarly secured by its pedestals to the tank, for rigid connection.

Figure 2:
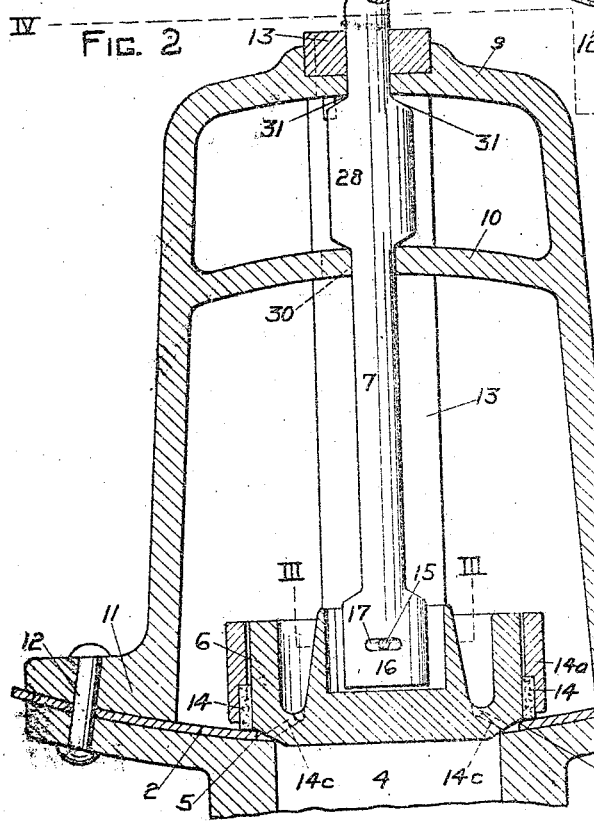
Fig. 2 is an enlarged sectional detail view of the opening and closing valve.
Figure 3:
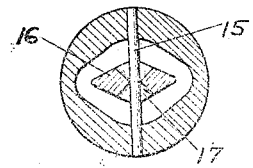
Fig. 3 is a cross section on the line III—III of Fig. 2.

Valve 6 is preferably provided with an annular packing 14 for making a tight closing engagement against the valve seat when lowered, as in Fig. 2. The packing ring 14 is so mounted in the valve that it will seat directly upon the inner edge of the shell 2, so that if the outlet conduit 4 should be broken, the closing of the valve will remain unimpaired. Spindle 7 is connected with the valve lugs 7ª by a cross pin 15 extending through the widened diamond shaped terminals 16 and flaring slot 17 thereof, providing for a limited range of twisting movement therein, as the stem is rotated to locking and unlocking position.

The valve 6 is itself prevented from rotation, while allowing for free upward and downward movement, by means of laterally extending guides 18 formed with or attached to the valve in any suitable way. As shown, they are integral extensions of the outer semi-circular clamping ring 14ª surrounding the valve 6 and tightly clamping the packing 14 thereto by bolts 14ᵇ. Valve 6 is provided with drainage holes 14ᶜ for surplus liquid, in emptying. Guides 18 embrace the vertical standards 13 at each side, with sufficient clearance to allow for free upward and downward movement under action of the raising and lowering stem 7.

As shown in Fig. 1, said stem, in its simplest form, is provided with an upper threaded terminal portion 19, provided with a squared top 20, for application of a wrench. The threaded portion is engaged by a nut 21 mounted in a cross plate or bearing 22, connected with the coping frame 23, the nut having a turning handle or hand wheel 24. By this means, the stem 7 may be raised or lowered with relation to the body of the car proper and frame 8.

The operating wheel is normally closed by a coping 25 pivoted at 26, and capable of being locked by a padlock or similar means at the other side, as at 27. By such arrangement, the coping may be opened to permit access to the wheel for adjustment, which is protected from unauthorized operation by the means shown.

In the operation of outlet valves in tank cars of the general type disclosed, there is usually present a variation between the top and bottom portions of the shell of the tank, due to expansion and contraction, or the strains of traffic, etc. Such variation is a frequent cause of leakage where the valve controlling the outlet is operated by the stem having its full length intervene between the valve and a controlling or locking element therefor located at the top of the car.

In my present invention, I avoid such objection by locating the controlling element for holding the stem of the valve and the valve itself, especially in lowered sealing position, by means of a construction located approximately adjacent to the valve itself, and so connected with its seat as to provide a practically rigid mounting, independent of the variations above referred to. For such purpose, valve stem 7 is provided with an abutment or shoulder 28, of any suitable form, as diamond shape in cross section, the laterally extending portions of the abutment being capable of free insertion through a corresponding opening or recess 29 down through the upper cross members 9 and 13 of the bracket support 8. The upper edges 31 of abutment 28 slope downwardly and outwardly, providing wedging faces, giving downward pressure upon rotation. The lower end of stem 7 is similarly shaped by the laterally extending diamond shaped terminal 16 above referred to. The transverse member 10 is also provided with a suitably shaped opening 30 for insertion and removal of the stem in assembling it with the valve 6.

In operation, assuming the valve open, with abutment 28 extending upwardly into the clearance recess 29, an operation of the hand wheel 24 and nut 21 will lower the valve 6 upon its seat, sufficient tightening movement thereof being effected by the nut. In such position, the abutment 28 is lowered below the recess 29, and by proper reverse movement of the nut, the frictional engagement with the threads 19 will operate to turn the stem 7 to bring the upper sloping edges 31 of abutment 28 underneath and across the lower face of the transverse member 9, as indicated in dotted lines, Fig. 4. In such position, the valve is pressed tightly against its seat, as in Fig. 2, and the stem 7 is positively locked by the shouldered engagement between the abutment and the frame, so that the stem is not subject to any variation from its normal contour, of the upper portion of the tank car 2.

In case of any undesired slippage, or failure to positively rotate the stem in the manner suggested, a wrench can be applied to the terminal 20 for independent rotation of the stem and seat of the valve 6. When it is desired to open the valve, the operation above described is reversed, abutment 28 first being brought into register with recess 29 and then raised by the thread and nut in the usual way.

Figure 10:
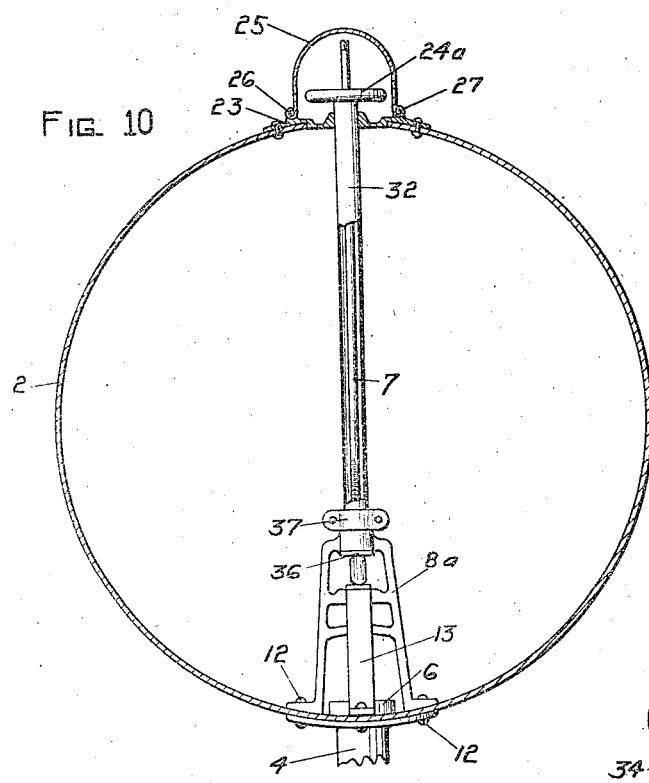
Fig. 10 is a view similar to Fig. 1, showing a modified construction.
Figure 11:
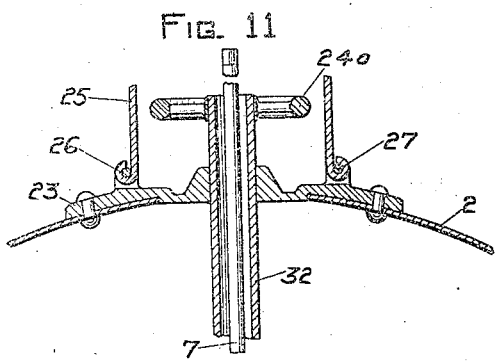
Fig. 11 is a vertical section, enlarged, of the upper end of the valve rod and actuating sleeve.
Figure 12:
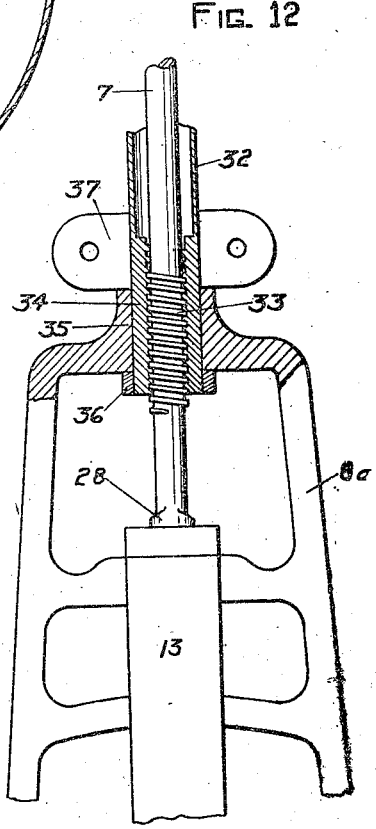
Fig. 12 is a similar view showing the threaded connection between the sleeve and rod and the mounting therefor in the supporting frame.

In the construction shown in Figs. 10, 11 and 12, I employ a sleeve 32 having an operating hand wheel 24ª, mounted in substantially the same manner as above described as to stem 7, but extending downwardly around the stem and having threaded engagement with it, as indicated at 33. The lower end 34 of sleeve 32 in such construction constitutes a nut journalled within the upwardly extending projection 35 of frame 8ª, being provided at its lower end with a terminal abutment 36 and at its upper portion with a clamping collar 37. These two elements operate to maintain the nut fixedly against vertical movement in its bearing 35, so as to positively raise and lower the stem 7 in the same manner as above described. In such construction, the locking abutment 28 is shown in its raised position, having been lifted by action of the threaded sleeve to raise the valve from its seat. Pins 38 limit rotation of abutment 28 to registering position.

With either construction, the positive raising and lowering of the valve is easily and accurately effected. The valve when lowered will be positively held to its seat independent of the objectionable vibrations, variations, etc. above referred to.

The advantages of the invention will be readily understood and appreciated by all those familiar with this class of mechanism. It overcomes the possibility of leakage due to the causes noted, and enables the use of an internal valve, overcoming the danger of loss of the contents of the tank car where a valve is mounted in the outlet conduit 4. The latter, as is well known, is frequently broken or lost, due to knocks and strains of traffic.

The invention may be variously changed or modified in detail construction by the skilled mechanic, but all such changes are to be considered as within the scope of the following claims.

What I claim is:

1. A valve for tank cars and the like provided with an extended rotatable operating stem having a lateral locking key abutment and a holding frame therefor located closely adjacent to the valve provided with a transverse opening for passage of the locking key abutment.

2. A valve for tank cars and the like provided with an extended rotatable operating stem having a lateral abutment and a holding frame therefor located closely adjacent to the valve and provided with a cross member having an opening providing a stem bearing with a lateral extension for clearance of the abutment thereof.

3. A valve for tank cars and the like provided with an extended operating stem and a holding frame therefor located closely adjacent to the valve and provided with clearance openings for the stem having laterally extending portions for passage of holding abutments on the stem.

4. In combination with a sealing valve for the outlet opening of a tank car or the like, a valve stem provided with a holding abutment, and a supporting frame therefor having a corresponding opening for the stem and its abutment.

5. In combination with a sealing valve for the outlet opening of a tank car or the like, a valve stem loosely connected with the valve and provided with a lateral abutment, and a guide frame for the stem located closely adjacent to the valve and provided with a registering opening for the stem and a lateral offset for the abutment thereof.

6. In combination with a sealing valve for the outlet opening of a tank car or the like, a valve stem provided with a holding abutment, and a supporting frame therefor having a corresponding opening for the stem and its abutment, and a limiting stop controlling rotation of the abutment.

7. A valve for tank cars and the like comprising a vertically arranged rotatable operating stem having a laterally extending wedging abutment, a vertically movable valve loosely connected with the end of the stem providing for a limited rotative movement thereof, and a holding and locking frame for the stem and abutment rigidly mounted with relation to the valve having a transverse member engaging the stem and abutment.

8. A valve for tank cars and the like provided with an extended rotatable operating stem having a locking abutment, a holding frame therefor located closely adjacent to the valve having a clearance opening for the abutment, and a raising and lowering hand wheel in threaded engagement with the stem.

9. A valve for tank cars and the like provided with an extended rotatable operating stem having a locking abutment, a holding frame therefor located closely adjacent to the valve having a laterally extended stem bearing clearance opening for the abutment, and a raising and lowering hand wheel provided with a sleeve in threaded engagement with the stem.

10. In combination with a vessel having a bottom outlet opening, a freely movable opening and closing valve, a rotatable stem loosely connected with the valve having a wedging abutment for seating the valve tightly upon the surrounding edge of the outlet opening, and a cross bearing for the stem and wedging abutment having a clearance opening for the latter.

11. In combination with a sheet metal container having an outlet opening and a delivery conduit thereon, an opening and closing valve having a sealing portion adapted to seat upon the inner surrounding edge portion of the container, a valve stem having a locking lug, and a supporting bracket therefor provided with cooperating holding portions for the stem and clearance for the locking lug.

In testimony whereof I hereunto affix my signature.

MONROE R. KREAMER.